(12) United States Patent
Chen

(10) Patent No.: US 11,102,685 B2
(45) Date of Patent: Aug. 24, 2021

(54) METHOD OF SWITCHING MEASUREMENT MODE AND DEVICE THEREOF

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/637,710

(22) PCT Filed: Aug. 8, 2018

(86) PCT No.: PCT/CN2018/099392
§ 371 (c)(1),
(2) Date: Feb. 7, 2020

(87) PCT Pub. No.: WO2019/029570
PCT Pub. Date: Feb. 14, 2019

(65) Prior Publication Data
US 2020/0178133 A1 Jun. 4, 2020

(30) Foreign Application Priority Data

Aug. 8, 2017 (CN) .......................... 201710672460.2

(51) Int. Cl.
*H04B 7/0408* (2017.01)
*H04L 5/00* (2006.01)
*H04W 36/00* (2009.01)

(52) U.S. Cl.
CPC . *H04W 36/00837* (2018.08); *H04W 36/0061* (2013.01); *H04W 36/0088* (2013.01); *H04W 36/0094* (2013.01)

(58) Field of Classification Search
None
See application file for complete search history.

(56) References Cited

U.S. PATENT DOCUMENTS

2009/0092056 A1  4/2009  Kitazoe
2012/0329402 A1  12/2012 Longtao et al.
(Continued)

FOREIGN PATENT DOCUMENTS

CN    102017698 A    4/2011
CN    102131253 A    7/2011
(Continued)

OTHER PUBLICATIONS

European Search Report in Application No. 18843871.7 dated Jun. 24, 2020.
(Continued)

*Primary Examiner* — Gary Lafontant
(74) *Attorney, Agent, or Firm* — Maschoff Brennan

(57) ABSTRACT

A method of switching a measurement mode and a device thereof are provided. The method includes: sending, by a network equipment, configuration information to a user equipment, to enable the user equipment to switch from a first measurement mode to a second measurement mode according to the configuration information; where the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met.

19 Claims, 5 Drawing Sheets

(56) References Cited

U.S. PATENT DOCUMENTS

| | | |
|---|---|---|
| 2013/0201914 A1 | 8/2013 | Wang et al. |
| 2014/0086112 A1 | 3/2014 | Stern-Berkowitz et al. |
| 2015/0079991 A1 | 3/2015 | Koskinen et al. |
| 2015/0237541 A1 | 8/2015 | Kim et al. |
| 2018/0091196 A1* | 3/2018 | Frenne .................... H04L 5/005 |

FOREIGN PATENT DOCUMENTS

| | | |
|---|---|---|
| CN | 2011130989 A | 10/2011 |
| CN | 102281568 A | 12/2011 |
| CN | 102457349 A | 5/2012 |
| CN | 102547881 A | 7/2012 |
| CN | 104602260 A | 5/2013 |
| CN | 103281721 A | 9/2013 |
| CN | 103546905 A | 1/2014 |
| CN | 105493551 A | 4/2016 |
| CN | 105517077 A | 4/2016 |
| CN | 105592496 A | 5/2016 |
| CN | 105792298 A | 7/2016 |
| CN | 106792884 A | 5/2017 |
| EP | 2 536 196 A1 | 12/2012 |
| KR | 20150097361 A | 8/2015 |
| WO | 2007/089128 A1 | 8/2007 |
| WO | 2010/128383 A1 | 11/2010 |
| WO | 2011/130989 A1 | 10/2011 |
| WO | 2016/075124 A1 | 5/2016 |

OTHER PUBLICATIONS

CN Office Action in Application No. 201710672460.2 dated Dec. 11, 2019.

CN Office Action in Application No. 201710672460.2 dated Oct. 8, 2019.

Written Opinion and International Search Report in Application No. PCT/CN2018/099392 dated Feb. 20, 2020.

European Office Action dated Apr. 9, 2021 as received in application No. 18843871.7.

Mach Thomas Heneryk et al.: "Measurement threshold configuration scheme based on the traffic load", IET Communications, the Institution of Engineering and Technology, GB. Aug. 14, 2014.

* cited by examiner

METHOD OF SWITCHING MEASUREMENT MODE AND DEVICE THEREOF

CROSS REFERENCE OF RELATED APPLICATION

The present application is the U.S. national phase of PCT Application PCT/CN2018/099392 filed on Aug. 8, 2018, which claims a priority of Chinese patent application No. 201710672460.2 filed on Aug. 8, 2017, which is incorporated herein by reference in its entirety.

TECHNICAL FIELD

The present disclosure relates to the field of communication technologies, and in particular, to a method of switching a measurement mode and a device thereof.

BACKGROUND

With the development of smart terminals, there are more and more sensors on smart terminals and the terminals are getting smarter. As shown in FIG. 1, the user equipment (UE) in different scenarios, such as UE1, UE2, and UE3, is able to accurately know whether they are in a moving state, the speed of movement and related movement information. In addition, the smart terminal carries more sensors to obtain the state or environment information or coverage information of the UE. Based on these information, behaviors of the UE can be optimized and controlled further. For example, multiple sets of trigger measurement parameters can be configured for the UE based on mobile information, environmental information, or coverage information. The UE can select different parameters to trigger idle and inactive neighbor measurement based on the state, so that different UEs can select different parameters for the measurement of neighboring cells according to its own state. For some scenarios where the terminal status changes infrequently, the measurement in the idle state and inactive state can be saved, which is equivalent to that the UE adopts a power-saving trigger measurement mode, thereby saving the power.

However, if the UE in the related art continues to be in the power-saving triggered measurement mode after some network status changes, the network may not be able to page the UE. Moreover, in the case that the network deployment changes, such as planning a new cell or deploying a new frequency point or replanning the frequency spectrum, if the UE continues to maintain a power-saving trigger measurement mode, the network resources cannot be used rationally.

SUMMARY

A method of switching a measurement mode is provided in the embodiments of the present disclosure, so as to solve the technical issue in the related art that the network resources cannot be used rationally in the case that the network deployment changes and the UE continues to maintain a power-saving trigger measurement mode.

In a first aspect, a method of switching a measurement mode is provided in the present disclosure, including: sending, by a network equipment, configuration information to a user equipment, to enable the user equipment to switch from a first measurement mode to a second measurement mode according to the configuration information; where the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met.

Compared with the related art, when the network deployment or planning changes, if the user equipment still adopts the first measurement mode (i.e., the power-saving measurement trigger mode), the user equipment will still camp on the current cell because the measurement trigger conditions of the first measurement mode are stricter. Only when the quality of the current cell is further deteriorated, the measurement of neighboring cells or neighboring frequency points may be triggered, which is not conducive to the full use of network resources. In the present disclosure, the user equipment may switch from the first measurement mode to the second measurement mode according to the configuration information. Therefore, when the network deployment or planning changes, for example, the operator plans a new cell or deploys a new frequency point or re-plans the frequency spectrum, the user equipment can use the second measurement mode. Since the second measurement mode is easier to trigger the measurement than the first measurement mode, the user equipment can trigger the measurements of neighboring cells or neighboring frequency points, and can reselect, based on the measurement results, the cell which is newly planned by operator, thereby realizing an offload, so as to make full use of network resources.

In some embodiments of the present disclosure, the configuration information includes first indication information configured to instruct switching from the first measurement mode to the second measurement mode.

Therefore, when the user equipment is in the first measurement mode, the user equipment can switch from the first measurement mode to the second measurement mode according to the first instruction information. Since the second measurement mode is easier to trigger measurement than the first measurement mode, the user equipment can trigger the measurement of neighboring cells or neighboring frequency points, and can reselect, based on the measurement results, the cell which is newly planned by operator, thereby realizing an offload, so as to make full use of network resources.

In some embodiments of the present disclosure, the configuration information includes second indication information configured to indicate whether to allow the first measurement mode or the second measurement mode to be enabled.

Therefore, when the user equipment receives the second instruction information, the user equipment may determine to work in the first measurement mode or the second measurement mode according to the second instruction information. The second indication information implicitly indicates whether the user equipment needs to switch the measurement mode. For example, when the user equipment is in the first measurement mode, if the second indication information is used to instruct the user equipment to work in the second measurement mode, the user equipment may switch from the first measurement mode to the second measurement mode. It can be understood that, since the second measurement mode is easier to trigger measurement than the first measurement mode, the user equipment can trigger the measurement of neighboring cells or neighboring frequency points, and can reselect, based on the measurement results, the cell which is newly planned by operator, thereby realizing an offload, so as to make full use of network resources.

In some embodiments of the present disclosure, the configuration information includes a network configuration parameter configured to instruct the user equipment to switch from the first measurement mode to the second measurement mode in the case that the user equipment determines that the network configuration parameter changes with respect to a current network configuration parameter.

It can be understood that the user equipment can receive in real time the configuration information sent by the network equipment. For example, the user equipment receives the first network configuration parameter at the first moment, and determines that it can work in the first measurement mode according to the first network configuration parameter. At a second time after the first time, the user equipment receives the second network configuration parameter, and determines that it can work in the second measurement mode according to the second network configuration parameter, thereby implementing the switching from the first measurement mode to the second measurement mode and making full use of network resources.

In some embodiments of the present disclosure, the network configuration parameter includes at least one of a neighboring cell list and a neighboring frequency point list. The network configuration parameters may also include other parameters, which are not limited in the present disclosure.

In some embodiments of the present disclosure, the configuration information includes preset time information, the preset time information includes a preset time point or a preset time period, and the preset time point is configured to indicate a time point of starting or stopping the second measurement mode, the preset time period is configured to indicate a duration of the first measurement mode or the second measurement mode.

Therefore, the user equipment can switch from the first measurement mode to the second measurement mode according to a preset time or a preset time period, thereby making full use of network resources.

In some embodiments of the present disclosure, the configuration information includes a first parameter corresponding to the first measurement mode and a second parameter corresponding to the second measurement mode, or the configuration information includes a second parameter corresponding to the second measurement mode, where the first parameter includes a first measurement parameter and/or a first offset, and the second parameter includes a second measurement parameter and/or a second offset.

When the configuration information includes the first parameter corresponding to the first measurement mode and the second parameter corresponding to the second measurement mode, the user equipment may work in the first measurement mode. When the configuration information includes the second parameter corresponding to the second measurement mode, the user equipment can work in the second measurement mode. Therefore, the user equipment can switch the working mode according to the change of the parameters. For example, when the user equipment works in the first measurement trigger mode, if the configuration information includes a second parameter corresponding to the second measurement mode, the user equipment can switch from the first measurement mode to the second measurement mode, thereby making full use of the network resource.

In some embodiments of the present disclosure, the network equipment sends a cell selection reselection parameter corresponding to the first measurement trigger condition, and/or the network equipment sends a cell selection reselection parameter corresponding to the second measurement trigger condition.

Therefore, when the user equipment works in the first measurement trigger mode, if the first measurement trigger condition is met, the user equipment can perform a cell selection or reselection according to a cell selection reselection parameter corresponding to the first measurement trigger condition. When the user equipment works in the second measurement trigger mode, if the second measurement trigger condition is met, the user equipment may perform a cell selection or reselection according to a cell selection reselection parameter corresponding to the second measurement trigger condition.

In a second aspect, a network equipment is further provided in the embodiments of the present disclosure, including: a sending unit, configured to send configuration information to a user equipment, to enable the user equipment to switch from a first measurement mode to a second measurement mode according to the configuration information; where the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met.

In some embodiments of the present disclosure, the configuration information includes first indication information configured to instruct switching from the first measurement mode to the second measurement mode.

In some embodiments of the present disclosure, the configuration information includes second indication information configured to indicate whether to allow the first measurement mode or the second measurement mode to be enabled.

In some embodiments of the present disclosure, the configuration information includes a network configuration parameter configured to instruct the user equipment to switch from the first measurement mode to the second measurement mode in the case that the user equipment determines that the network configuration parameter changes with respect to a current network configuration parameter.

In some embodiments of the present disclosure, the network configuration parameter includes at least one of a neighboring cell list and a neighboring frequency point list.

In some embodiments of the present disclosure, the configuration information includes preset time information, the preset time information includes a preset time point or a preset time period, and the preset time point is configured to indicate a time point of starting or stopping the second measurement mode, the preset time period is configured to indicate a duration of the first measurement mode or the second measurement mode.

In some embodiments of the present disclosure, the configuration information includes a first parameter corresponding to the first measurement mode and a second parameter corresponding to the second measurement mode, or the configuration information includes a second parameter corresponding to the second measurement mode, where the first parameter includes a first measurement parameter and/or a first offset, and the second parameter includes a second measurement parameter and/or a second offset.

In some embodiments of the present disclosure, the sending unit is further configured to send a cell selection reselection parameter corresponding to the first measurement trigger condition, and/or send a cell selection reselection parameter corresponding to the second measurement trigger condition.

For the technical effects and embodiments of the second aspect, reference may be made to the technical effects and embodiments of the first aspect, which are not repeated here.

In a third aspect, a device is further provided in the embodiments of the present disclosure. The device exists in the form of a chip product. The structure of the device includes a processor and a memory. The memory is used for coupling with the processor and stores program instructions and data necessary for the device, the processor is configured to execute program instructions stored in the memory, so as to perform the functions of the network equipment in the foregoing method.

In a fourth aspect, a network equipment is further provided in the embodiments of the present disclosure, which can implement a function performed by the network equipment in the foregoing method embodiment, and the function may be implemented by hardware, or may be implemented by hardware executing corresponding software. The hardware or software includes one or more modules corresponding to the foregoing functions.

In some embodiments of the present disclosure, a structure of the network equipment includes a processor and a communication interface, and the processor is configured to support the network equipment to perform a corresponding function in the foregoing method. The communication interface is used to support the communication between the network equipment and other network elements. The network equipment may further include a memory, which is coupled to the processor and stores program instructions and data necessary for the network equipment.

In a fifth aspect, a computer-readable storage medium is further provided in the embodiments of the present disclosure, including instructions, the instruction are run on a computer to enable the computer to perform any one of the methods provided in the first aspect.

In a sixth aspect, a computer program product containing instructions is further provided in the embodiments of the present disclosure, the computer program product is run on a computer to enable the computer to perform any one of the methods provided in the first aspect.

In a seventh aspect, a method of switching a measurement mode is provided in the embodiments of the present disclosure, including: receiving, by the user equipment, configuration information sent by a network equipment; and the user equipment switching from a first measurement mode to a second measurement mode according to the configuration information; where the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met. Compared with the related art, when the network deployment or planning changes, if the user equipment still adopts the first measurement mode (i.e., the power-saving measurement trigger mode), the user equipment will still camp on the current cell because the measurement trigger conditions of the first measurement mode are stricter. Only when the quality of the current cell is further deteriorated, the measurement of neighboring cells or neighboring frequency points may be triggered, which is not conducive to the full use of network resources. In the present disclosure, the user equipment may switch from the first measurement mode to the second measurement mode according to the configuration information. Therefore, when the network deployment or planning changes, for example, the operator plans a new cell or deploys a new frequency point or re-plans the frequency spectrum, the user equipment can use the second measurement mode. Since the second measurement mode is easier to trigger the measurement than the first measurement mode, the user equipment can trigger the measurements of neighboring cells or neighboring frequency points, and can reselect, based on the measurement results, the cell which is newly planned by operator, thereby realizing an offload, so as to make full use of network resources.

In some embodiments of the present disclosure, the configuration information includes first indication information configured to instruct switching from the first measurement mode to the second measurement mode.

Therefore, when the user equipment is in the first measurement mode, the user equipment can switch from the first measurement mode to the second measurement mode according to the first instruction information. Since the second measurement mode is easier to trigger measurement than the first measurement mode, the user equipment can trigger the measurement of neighboring cells or neighboring frequency points, and can reselect, based on the measurement results, the cell which is newly planned by operator, thereby realizing an offload, so as to make full use of network resources.

In some embodiments of the present disclosure, the configuration information includes second indication information configured to indicate whether to allow the first measurement mode or the second measurement mode to be enabled.

Therefore, when the user equipment receives the second instruction information, the user equipment may determine to work in the first measurement mode or the second measurement mode according to the second instruction information. The second indication information implicitly indicates whether the user equipment needs to switch the measurement mode. For example, when the user equipment is in the first measurement mode, if the second indication information is used to instruct the user equipment to work in the second measurement mode, the user equipment may switch from the first measurement mode to the second measurement mode. It can be understood that, since the second measurement mode is easier to trigger measurement than the first measurement mode, the user equipment can trigger the measurement of neighboring cells or neighboring frequency points, and can reselect, based on the measurement results, the cell which is newly planned by operator, thereby realizing an offload, so as to make full use of network resources.

In some embodiments of the present disclosure, the configuration information includes network configuration parameters, and the transition of the user equipment from the first measurement mode to the second measurement mode according to the configuration information includes: if the user equipment determines that the network configuration parameter changes with respect to the current network configuration parameter, Then, the first measurement mode is switched to the second measurement mode, and the current network configuration parameter is a parameter used by the user equipment in the first measurement mode.

It can be understood that the user equipment can receive in real time the configuration information sent by the network equipment. For example, the user equipment receives the first network configuration parameter at the first moment, and determines that it can work in the first measurement mode according to the first network configuration parameter. At a second time after the first time, the user equipment receives the second network configuration parameter, and determines that it can work in the second measurement mode according to the second network configuration parameter, thereby implementing the switching from the first measurement mode to the second measurement mode and making full use of network resources.

In some embodiments of the present disclosure, the network configuration parameter includes at least one of a neighboring cell list and a neighboring frequency point list. The network configuration parameters may also include other parameters, which are not limited in the present disclosure.

In some embodiments of the present disclosure, the configuration information includes preset time information, the preset time information includes a preset time point or a preset time period, and the preset time point is configured to indicate a time point of starting or stopping the second measurement mode, the preset time period is configured to indicate a duration of the first measurement mode or the second measurement mode.

Therefore, the user equipment can switch from the first measurement mode to the second measurement mode according to a preset time or a preset time period, thereby making full use of network resources.

In some embodiments of the present disclosure, the configuration information includes a first parameter corresponding to the first measurement mode and a second parameter corresponding to the second measurement mode, or the configuration information includes a second parameter corresponding to the second measurement mode, where the first parameter includes a first measurement parameter and/or a first offset, and the second parameter includes a second measurement parameter and/or a second offset.

When the configuration information includes the first parameter corresponding to the first measurement mode and the second parameter corresponding to the second measurement mode, the user equipment may work in the first measurement mode. When the configuration information includes the second parameter corresponding to the second measurement mode, the user equipment can work in the second measurement mode. Therefore, the user equipment can switch the working mode according to the change of the parameters. For example, when the user equipment works in the first measurement trigger mode, if the configuration information includes a second parameter corresponding to the second measurement mode, the user equipment can switch from the first measurement mode to the second measurement mode, thereby making full use of the network resource.

In some embodiments of the present disclosure, the switching from the first measurement mode to the second measurement mode includes: acquiring, by the user equipment, the second measurement trigger condition; reconfiguring, by the user equipment, the first measurement trigger condition to the second measurement trigger condition; where the first measurement trigger condition includes one of: a receiving performance of the current cell is less than a first threshold, the receiving performance of the current cell and a first compensation value are less than the first threshold, or a first state parameter changes; the second measurement trigger condition includes one of: the receiving performance of the current cell is less than a second threshold, the receiving performance of the current cell and a second compensation value are less than the second threshold, a second state parameter changes.

That is, when the user equipment works in the first measurement mode, if it is determined that the receiving performance of the cell is less than the first threshold, or that the receiving performance of the cell and the first compensation value are less than the first threshold, or that the first state parameter is changed, the measurements of current cell or neighboring cells may be triggered. When the user equipment works in the second measurement mode, the measurements of current cell or neighboring cells may be triggered if it is determined that the receiving performance of the cell is less than the second threshold, or that the receiving performance of the cell and the first compensation value are less than the second threshold, or that the second state parameter is changed.

When the first measurement trigger condition is that the receiving performance of the current cell is less than the first threshold, the first threshold may be determined by the user equipment according to the first state parameter of the user equipment. When the second measurement trigger condition is that the receiving performance of the cell is less than the second threshold, the second threshold may be determined by the user equipment according to the second state parameter of the user equipment.

When the first measurement trigger condition is the receiving performance of the current cell and the first compensation value is less than the first threshold, the first compensation value may be determined by the user equipment according to the first state parameter of the user equipment, and the first threshold may be determined by the user equipment according to the first state parameter of the user equipment or broadcasted by the network equipment. When the second measurement trigger condition is the receiving performance of the current cell and the second compensation value is less than the second threshold, the second compensation value may be determined by the user equipment according to the second state parameter of the user equipment, and the second threshold may be determined by the user equipment according to the second state parameter of the user equipment or broadcasted by the network equipment.

When the first threshold is determined by the user equipment according to the first state parameter of the user equipment, and the second threshold is determined by the user equipment according to the second state parameter of the user equipment, the threshold value of the first threshold and the threshold value of the second threshold may be different. When the receiving performance of the cell is RSRP, RSRQ, or SINR, the threshold value of the first threshold is usually less than the threshold value of the second threshold. It can be understood that this is because when the user is in the first measurement mode, setting a lower threshold value can make the conditions for triggering the measurement stricter. When the receiving performance of the cell is RSSI, the first threshold value is usually larger than the second threshold value. Because when the user is in the first measurement mode, setting a higher threshold value can make the conditions for triggering the measurement stricter, so that the second measurement mode is easier to trigger the measurement than the first measurement mode. Therefore, if the network configuration changes, for example, the operator has newly planned a new cell or deployed a new frequency point or re-planned the spectrum, the user equipment in the second measurement mode is easier to measure the new cell, so that the user equipment may reselect, based on the measurement results, the cell which is newly planned by operator, thereby realizing an offload, so as to make full use of network resources.

In some embodiments of the present disclosure, the acquiring, by the user equipment, the second measurement trigger condition includes: receiving, by the user equipment, a measurement configuration parameter sent by the network equipment, where the measurement configuration parameter is configured to indicate the second measurement trigger condition.

That is, when the network equipment instructs the user equipment to switch from the first measurement mode to the second measurement mode, the second measurement trigger condition may be indicated to the user equipment.

In some embodiments of the present disclosure, the acquiring, by the user equipment, the second measurement trigger condition includes: determining, by the user equipment, the second measurement trigger condition according to the network configuration parameter That is, when the user equipment needs to switch from the first measurement mode to the second measurement mode, the second measurement trigger condition may be determined according to a network configuration parameter.

In some embodiments of the present disclosure, the user equipment performs a cell selection or reselection according to a cell selection reselection parameter corresponding to the first measurement trigger condition, or the user equipment performs a cell selection or reselection according to a cell selection reselection parameter corresponding to the second measurement trigger condition.

Therefore, when the user equipment works in the first measurement trigger mode, the user equipment can perform a cell selection or reselection according to a cell selection reselection parameter corresponding to the first measurement trigger condition. When the user equipment works in the second measurement trigger mode, the user equipment may perform a cell selection or reselection according to a cell selection reselection parameter corresponding to the second measurement trigger condition.

In an eighth aspect, a user equipment is provided in some embodiments of the present disclosure, including: a receiving unit, configured to receive configuration information sent by a network equipment; and a processing unit, configured to switch from a first measurement mode to a second measurement mode according to the configuration information; where the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met.

In some embodiments of the present disclosure, the configuration information includes first indication information configured to instruct switching from the first measurement mode to the second measurement mode.

In some embodiments of the present disclosure, the configuration information includes second indication information configured to indicate whether to allow the first measurement mode or the second measurement mode to be enabled.

In some embodiments of the present disclosure, the configuration information includes a network configuration parameter, and the processing unit is further configured to: switch from the first measurement mode to the second measurement mode in case of determining that the network configuration parameter changes with respect to a current network configuration parameter, where the current network configuration parameter is a parameter used by the user equipment in the first measurement mode.

In some embodiments of the present disclosure, the network configuration parameter includes at least one of a neighboring cell list and a neighboring frequency point list.

In some embodiments of the present disclosure, the configuration information includes preset time information, the preset time information includes a preset time point or a preset time period, and the preset time point is configured to indicate a time point of starting or stopping the second measurement mode, the preset time period is configured to indicate a duration of the first measurement mode or the second measurement mode.

In some embodiments of the present disclosure, the configuration information includes a first parameter corresponding to the first measurement mode and a second parameter corresponding to the second measurement mode, or the configuration information includes a second parameter corresponding to the second measurement mode, where the first parameter includes a first measurement parameter and/or a first offset, and the second parameter includes a second measurement parameter and/or a second offset.

In some embodiments of the present disclosure, the processing unit is further configured to: acquire the second measurement trigger condition; reconfigure the first measurement trigger condition to the second measurement trigger condition; where the first measurement trigger condition includes one of: a receiving performance of the current cell is less than a first threshold, the receiving performance of the current cell and a first compensation value are less than the first threshold, or a first state parameter changes; the second measurement trigger condition includes one of: the receiving performance of the current cell is less than a second threshold, the receiving performance of the current cell and a second compensation value are less than the second threshold, a second state parameter changes.

In some embodiments of the present disclosure, the processing unit is configured to: receive a measurement configuration parameter sent by the network equipment, where the measurement configuration parameter is configured to indicate the second measurement trigger condition.

In some embodiments of the present disclosure, the processing unit is configured to: determine the second measurement trigger condition according to the network configuration parameter.

In some embodiments of the present disclosure, the processing unit is configured to: perform a cell selection or reselection according to a cell selection reselection parameter corresponding to the first measurement trigger condition, or perform a cell selection or reselection according to a cell selection reselection parameter corresponding to the second measurement trigger condition.

For the technical effects and embodiments of the eighth aspect, reference may be made to the technical effects and embodiments of the seventh aspect, which are not repeated here.

In a ninth aspect, a device is further provided in the embodiments of the present disclosure. The device exists in the form of a chip product. The structure of the device includes a processor and a memory. The memory is used for coupling with the processor and stores program instructions and data necessary for the device, the processor is configured to execute program instructions stored in the memory, so as to perform the functions of the network equipment in the foregoing method.

In a tenth aspect, a user equipment is further provided in the embodiments of the present disclosure, which can implement a function performed by the user equipment in the foregoing method embodiment, and the function may be implemented by hardware, or may be implemented by hardware executing corresponding software. The hardware or software includes one or more modules corresponding to the foregoing functions.

In some embodiments of the present disclosure, a structure of the user equipment includes a processor and a communication interface, and the processor is configured to support the user equipment to perform a corresponding function in the foregoing method. The communication interface is used to support the communication between the user equipment and other network elements. The network equipment may further include a memory, which is coupled to the processor and stores program instructions and data necessary for the user equipment.

In an eleventh aspect, a computer-readable storage medium is further provided in the embodiments of the present disclosure, including instructions, the instruction are run on a computer to enable the computer to perform any one of the methods provided in the seventh aspect.

In a twelfth aspect, a computer program product containing instructions is further provided in the embodiments of the present disclosure, the computer program product is run on a computer to enable the computer to perform any one of the methods provided in the seventh aspect.

In a thirteenth aspect, a method of switching a measurement mode is provided in the embodiments of the present disclosure, including: the user equipment switching from a first measurement mode to a second measurement mode according to a preset time information; where the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met. Compared with the related art, when the network deployment or planning changes, if the user equipment still adopts the first measurement mode (i.e., the power-saving measurement trigger mode), the user equipment will still camp on the current cell because the measurement trigger conditions of the first measurement mode are stricter. Only when the quality of the current cell is further deteriorated, the measurement of neighboring cells or neighboring frequency points may be triggered, which is not conducive to the full use of network resources. In the present disclosure, the user equipment may switch from the first measurement mode to the second measurement mode according to the configuration information. Therefore, when the network deployment or planning changes, for example, the operator plans a new cell or deploys a new frequency point or re-plans the frequency spectrum, the user equipment can use the second measurement mode. Since the second measurement mode is easier to trigger the measurement than the first measurement mode, the user equipment can trigger the measurements of neighboring cells or neighboring frequency points, and can reselect, based on the measurement results, the cell which is newly planned by operator, thereby realizing an offload, so as to make full use of network resources.

In some embodiments of the present disclosure, the preset time information includes a preset time point or a preset time period, and the preset time point is configured to indicate a time point of starting or stopping the second measurement mode, the preset time period is configured to indicate a duration of the first measurement mode or the second measurement mode.

Therefore, the user equipment may switch from the first measurement mode to the second measurement mode according to a preset time or a preset time period, thereby making full use of network resources.

In some embodiments of the present disclosure, prior to the user equipment switching from a first measurement mode to a second measurement mode according to a preset time information, the method further includes: determining, by the user equipment, the preset time information according to a state parameter of the user equipment, where the state parameter of the user equipment includes at least one of: a type of the user equipment, whether the user equipment is movable, a maximum moving speed of the user equipment, a current moving state of the user equipment, a current service state of the user equipment, a state of a network where the user equipment is currently located, and a state of a channel where the user equipment is currently located.

That is, the preset time information may be determined by the user equipment according to a state parameter of the user equipment. Therefore, the user equipment may switch from the first measurement mode to the second measurement mode according to the preset time information, thereby making full use of network resources.

In some embodiments of the present disclosure, prior to the user equipment switching from a first measurement mode to a second measurement mode according to a preset time information, the method further includes: receiving, by the user equipment, configuration information sent by a network equipment, where the configuration information includes the preset time information.

That is, the preset time information may be determined by the network equipment and sent to the user equipment. Therefore, the user equipment can switch from the first measurement mode to the second measurement mode according to the preset time information, thereby making full use of network resources.

In some embodiments of the present disclosure, the user equipment performs a cell selection or reselection according to a cell selection reselection parameter corresponding to the first measurement trigger condition, or the user equipment performs a cell selection or reselection according to a cell selection reselection parameter corresponding to the second measurement trigger condition.

Therefore, when the user equipment works in the first measurement trigger mode, the user equipment may perform a cell selection or reselection according to a cell selection reselection parameter corresponding to the first measurement trigger condition. When the user equipment works in the second measurement trigger mode, the user equipment may perform a cell selection or reselection according to a cell selection reselection parameter corresponding to the second measurement trigger condition.

In a fourteenth aspect, a user equipment is provided in the embodiments of the present disclosure, including: a processing unit, configured to switch from a first measurement mode to a second measurement mode according to a preset time information; where the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met.

In some embodiments of the present disclosure, the preset time information includes a preset time point or a preset time period, and the preset time point is configured to indicate a time point of starting or stopping the second measurement mode, the preset time period is configured to indicate a duration of the first measurement mode or the second measurement mode.

In some embodiments of the present disclosure, the processing unit is further configured to: determine the preset time information according to a state parameter of the user equipment, where the state parameter of the user equipment includes at least one of: a type of the user equipment, whether the user equipment is movable, a maximum moving speed of the user equipment, a current moving state of the user equipment, a current service state of the user equipment, a state of a network where the user equipment is currently located, and a state of a channel where the user equipment is currently located.

In some embodiments of the present disclosure, the user equipment further includes a receiving unit configured to: receive configuration information sent by a network equipment, where the configuration information includes the preset time information.

In some embodiments of the present disclosure, the processing unit is further configured to perform a cell selection or reselection according to a cell selection reselection parameter corresponding to the first measurement trigger condition, or perform a cell selection or reselection according to a cell selection reselection parameter corresponding to the second measurement trigger condition.

For the technical effects and embodiments of the fourteenth aspect, reference may be made to the technical effects and embodiments of the thirteenth aspect, which are not repeated here.

In a fifteenth aspect, a device is further provided in the embodiments of the present disclosure. The device exists in the form of a chip product. The structure of the device includes a processor and a memory. The memory is used for coupling with the processor and stores program instructions and data necessary for the device, the processor is configured to execute program instructions stored in the memory, so as to perform the functions of the network equipment in the foregoing method.

In a sixteenth aspect, a user equipment is further provided in the embodiments of the present disclosure, which can implement a function performed by the user equipment in the foregoing method embodiment, and the function may be implemented by hardware, or may be implemented by hardware executing corresponding software. The hardware or software includes one or more modules corresponding to the foregoing functions.

In some embodiments of the present disclosure, a structure of the user equipment includes a processor and a communication interface, and the processor is configured to support the user equipment to perform a corresponding function in the foregoing method. The communication interface is used to support the communication between the user equipment and other network elements. The network equipment may further include a memory, which is coupled to the processor and stores program instructions and data necessary for the user equipment.

In a seventeenth aspect, a computer-readable storage medium is further provided in the embodiments of the present disclosure, including instructions, the instruction are run on a computer to enable the computer to perform any one of the methods provided in the thirteenth aspect.

In an eighteenth aspect, a computer program product containing instructions is further provided in the embodiments of the present disclosure, the computer program product is run on a computer to enable the computer to perform any one of the methods provided in the thirteenth aspect.

Compared with the related art, when the network deployment or planning changes, if the user equipment still adopts the first measurement mode (i.e., the power-saving measurement trigger mode), the user equipment will still camp on the current cell because the measurement trigger conditions of the first measurement mode are stricter. In the present disclosure, the user equipment may switch from the first measurement mode to the second measurement mode according to the configuration information. Since the second measurement mode is easier to trigger the measurement than the first measurement mode, the user equipment can trigger the measurements of neighboring cells or neighboring frequency points, and can reselect, based on the measurement results, the cell which is newly planned by operator, thereby realizing an offload, so as to make full use of network resources.

DETAILED DESCRIPTION

The technical solution provided by the present disclosure can be applied to 5G communication systems, future evolution systems, multiple communication convergence systems, Long Term Evolution (LTE) communication systems, and so on. Can include multiple application scenarios, such as machine to machine (M2M), D2M, macro communication, enhanced mobile Internet (eMBB), ultra high reliability and ultra low latency communication (ultra reliable & low latency communication (uRLLC) and mass machine type communication (mMTC). These scenarios may include, but are not limited to, a communication scenario between a base station and user equipment. For example, the technical solution provided in the embodiment of the present disclosure may be applied to a scenario in which cell measurement is triggered in communication between a base station and a user equipment.

Figure 1:
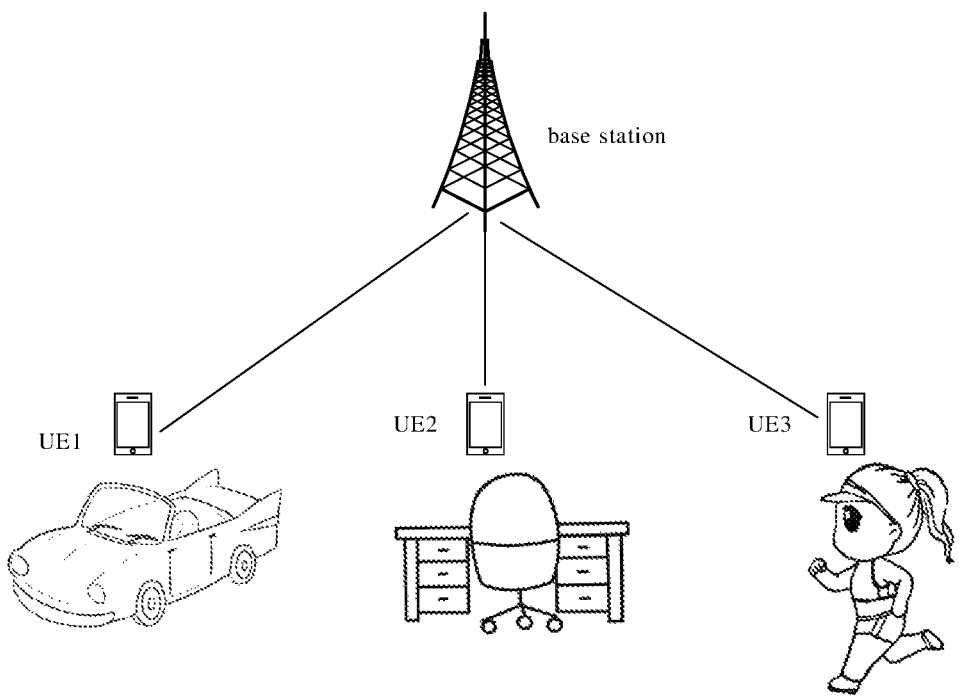
FIG. 1 is a schematic view of a scenario of terminals in different moving states.
Figure 2:
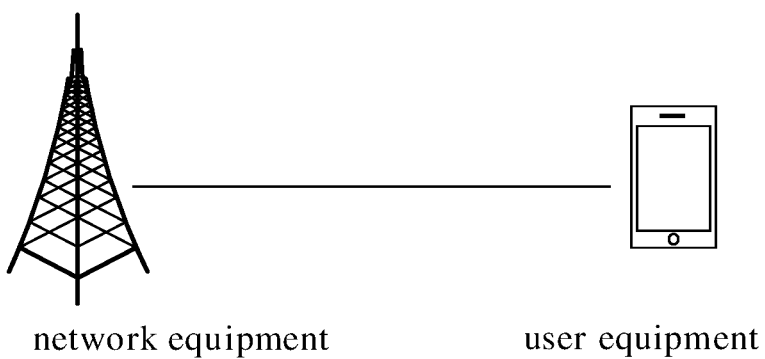
FIG. 2 is a system architecture diagram in the embodiment of the present disclosure.

As shown in FIG. 2, the architecture of the present disclosure may include network equipment and user equipment. The network equipment can be configured to instruct the user equipment to switch between different measurement modes. The user equipment may use different measurement modes to trigger measurements on neighboring cells and/or the current cell. The neighboring cell includes at least one of a neighboring cell at the same frequency, a cell at a neighboring frequency point, or a cell at another frequency point.

The network equipment may include a base station. The base station may be a Base Transceiver Station (BTS) in Global System of Mobile communication (GSM) or Code Division Multiple Access (CDMA), or may be a base station (NodeB, NB) in Wideband Code Division Multiple Access (WCDMA), or may be an Evolutionary Node B (eNB or eNodeB) in LTE, or it can be a New base stations in radio access technology (New RAT or NR), or relay stations or access points, or base stations in future 5G networks.

The user equipment may be a wireless terminal or a wired terminal. The wireless terminal may be a device that provides users with voice and/or other business data connectivity, a handheld device with a wireless connection function, or other processing equipment connected to a wireless modem. A wireless terminal can communicate with one or more core networks via a radio access network (Radio Access Network, RAN). A wireless terminal can be a mobile terminal, such as a mobile phone (also called a "cellular" phone) and a computer with a mobile terminal. For example, the wireless terminal may be a portable, compact, handheld, computer-built or vehicle-mounted mobile device, or a personal communication service (PCS) phone, cordless phone, or Session Initiation Protocol (SIP)) Phones, wireless local loop (Wireless Local Loop, WLL) stations, personal digital assistants (PDA) and other equipment. A wireless terminal can also be referred to as a system, a subscriber unit, a subscriber station, a mobile station, a mobile station, a mobile station, a remote station, a remote terminal, an Access Terminal, a User Terminal, a User Agent, a User Device or User Equipment, which are not limited herein.

A method of switching a measurement mode is provided in the embodiment of the present disclosure. The basic process is as follows: a network equipment sends configuration information to a user device. The user equipment may determine a switching from the first measurement mode to the second measurement mode according to the configuration information or a change in the configuration information. The first measurement mode refers to triggering by the user equipment, according to a first measurement trigger condition, a measurement on a current cell and/or a neighboring cell of the user equipment. The second measurement mode refers to triggering by the user equipment, according to a second measurement trigger condition, a measurement on a current cell and/or a neighboring cell of the user equipment.

The terms "first", "second", "third", and "fourth" in the description and claims of the present disclosure and the above-mentioned drawings are configured to distinguish different objects, rather than to define a specific order.

Figure 3:
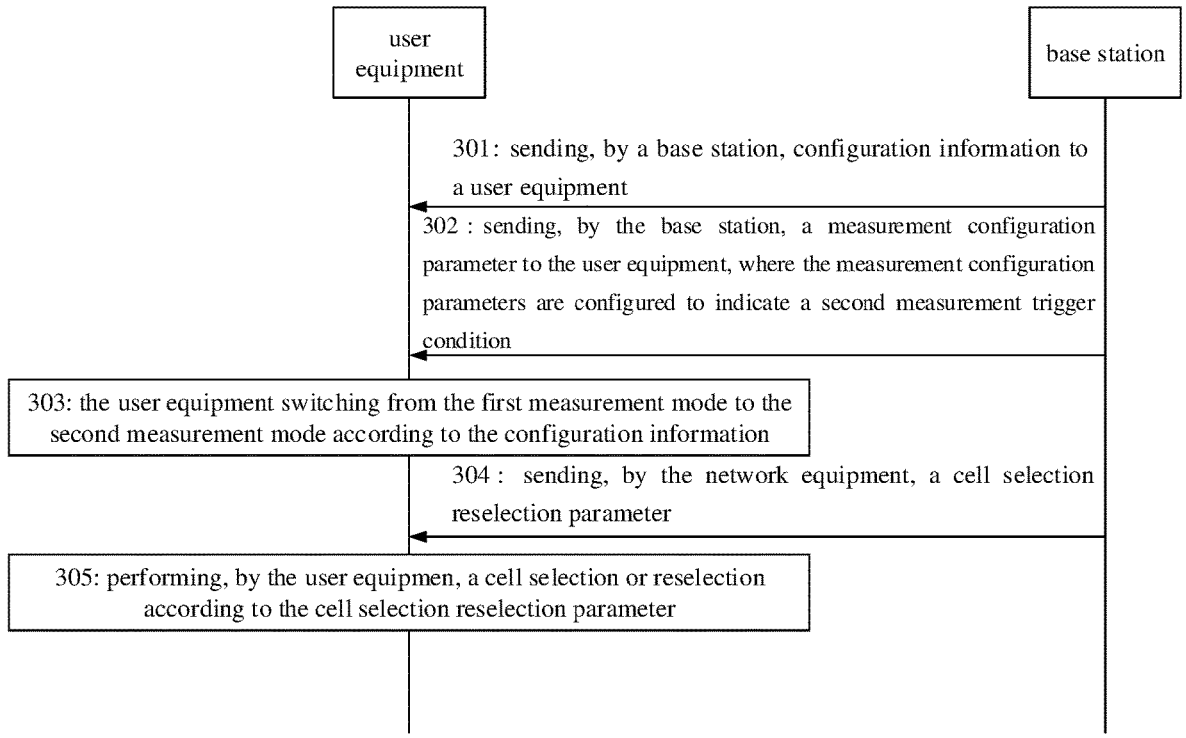
FIG. 3 is a schematic view of a signal interaction of a switching measurement mode in an embodiment of the present disclosure.

A method of switching a measurement mode is provided in the embodiment of the present disclosure, where the network equipment is a base station. As shown in FIG. 3, the method includes:

301: sending, by a base station, configuration information to a user equipment.

The base station may send configuration information to the user equipment through a system message, a broadcast message, or a Radio Resource Control (RRC) message.

In some embodiments of the present disclosure, the configuration information includes first indication information configured to instruct the user equipment in the first measurement mode to switch from the first measurement mode to the second measurement mode. The first measurement mode is a mode of triggering the user equipment to measure a current cell and/or a neighboring cell of the user equipment in the case that a first measurement trigger condition is met. The current cell refers to the current serving cell of the user equipment or a cell where the user equipment camps on.

The first measurement trigger condition includes one of: a receiving performance of the current cell is less than a first threshold, the receiving performance of the current cell and a first compensation value are less than the first threshold, or a first state parameter changes. The first threshold may be determined by the user equipment according to a first state parameter of the user equipment. The state parameter of the user equipment includes at least one of: a type of the user equipment, whether the user equipment is movable, a maximum moving speed of the user equipment, a current moving state of the user equipment, a current service state of the user equipment, a state of a network where the user equipment is currently located, and a state of a channel where the user equipment is currently located.

The receiving performance of current cell includes: a Reference Signal Receiving Power (RSRP), a Reference Signal Receiving Quality (RSRQ), a Signal to Interference plus Noise Ratio (SINR), a Received Signal Strength Indication (RSSI).

Optionally, the first measurement trigger condition may include that the reception level value (Srxlev) of the cell is less than the first intra-frequency measurement start threshold ($S_{IntraSearch}$), or the reception level value of the cell is less than the first inter-frequency measurement start threshold ($S_{nonIntraSearch}$). The first intra-frequency measurement start threshold and the first inter-frequency measurement start threshold may be determined by a base station or user equipment.

Optionally, the first measurement trigger condition may include that the reception level value of the cell is less than the second intra-frequency measurement start threshold, or the reception level value of the cell is less than the second inter-frequency measurement start threshold. The second intra-frequency measurement start threshold and the second inter-frequency measurement start threshold may be determined by a base station or user equipment.

The second measurement mode is a mode of triggering the user equipment to measure a current cell and/or a neighboring cell in the case that a second measurement trigger condition is met.

The second measurement trigger condition includes one of: a receiving performance of the current cell is less than a second threshold, the receiving performance of the current cell and a second compensation value are less than the second threshold, or a second state parameter changes. The second threshold may be determined by the user equipment according to a second state parameter of the user equipment. The state parameter of the user equipment includes at least one of: a type of the user equipment, whether the user equipment is movable, a maximum moving speed of the user equipment, a current moving state of the user equipment, a current service state of the user equipment, a state of a network where the user equipment is currently located, and a state of a channel where the user equipment is currently located.

In some embodiments of the present disclosure, the threshold value of the first threshold and the threshold value of the second threshold may be different. When the receiving performance of the cell is RSRP, RSRQ, or SINR, the threshold value of the first threshold is usually less than the threshold value of the second threshold. It can be understood that this is because when the user is in the first measurement mode, setting a lower threshold value can make the conditions for triggering the measurement stricter. When the receiving performance of the cell is RSSI, the first threshold value is usually larger than the second threshold value. Because when the user is in the first measurement mode, setting a higher threshold value can make the conditions for triggering the measurement stricter, so that the second measurement mode is easier to trigger the measurement than the first measurement mode. Therefore, if the network configuration changes, for example, the operator has newly planned a new cell or deployed a new frequency point or re-planned the spectrum, the user equipment in the second measurement mode is easier to measure the new cell, so that the user equipment may reselect, based on the measurement results, the cell which is newly planned by operator, thereby realizing an offload, so as to make full use of network resources.

Optionally, the second measurement trigger condition may include that the cell quality value (Squal) is less than the third intra-frequency measurement start threshold, or the quality value of the current cell is less than the third inter-frequency measurement start threshold. The third intra-frequency measurement start threshold and the third inter-frequency measurement start threshold may be determined by a base station or user equipment.

In some embodiments of the present disclosure, the second intra-frequency measurement start threshold is less than the first intra-frequency measurement start threshold, and the second inter-frequency measurement start threshold is less than the first inter-frequency measurement start threshold.

Optionally, the second measurement trigger condition may include that the quality value of the current cell is less than the fourth intra-frequency measurement start threshold, or the quality value of the current cell is less than the fourth inter-frequency measurement start threshold. The fourth intra-frequency measurement start threshold and the fourth inter-frequency measurement start threshold may be determined by the base station or user equipment.

In some embodiments of the present disclosure, the fourth intra-frequency measurement start threshold is less than the third intra-frequency measurement start threshold, and the fourth inter-frequency measurement start threshold is less than the third inter-frequency measurement start threshold.

In another embodiment, the configuration information may include second indication information, and the second indication information is configured to indicate whether to allow the first measurement mode or the second measurement mode to be enabled. It can be understood that the second indication information may implicitly indicate whether the user equipment switches from the first work mode to the second work mode, or whether the user equipment switches from the second work mode to the first work mode.

For example, in the case that the second indication information is configured to indicate that the first measurement mode is allowed to be enabled, if the user equipment works in the second measurement mode, the user equipment switches from the second measurement mode to the first measurement mode. When the second indication information is configured to indicate that the second measurement mode is allowed to be enabled, if the user equipment works in the first measurement mode, the user equipment switches from the first measurement mode to the second measurement mode. When the second indication information is configured to indicate that it is not allowed to enable the first measurement mode, if the user equipment works in the first measurement mode, the user equipment switches from the first measurement mode to the second measurement mode. When the second indication information is configured to indicate that it is not allowed to enable the second measurement mode, if the user equipment works in the second measurement mode, the user equipment switches from the second measurement mode to the first measurement mode.

In a possible case, in the case that the bit value of the second indication information is 1, it may be configured to indicate that the first measurement mode or the second measurement mode is allowed to be enabled. When the bit value of the second indication information is 0, it may be configured to indicate that the first measurement mode or the second measurement mode is not allowed to be enabled.

In a possible case, in the case that the bit value of the second indication information is 01, it may be configured to indicate that the first measurement mode is allowed to be enabled. When the bit value of the second indication information is 10, it may be configured to indicate that the second measurement mode is allowed to be enabled. When the bit value of the second indication information is 00, it may be configured to indicate that the first measurement mode is not allowed to be enabled. When the bit value of the second indication information is 11, it may be configured to indicate that the second measurement mode is not allowed to be enabled.

In another embodiment, the configuration information includes a network configuration parameter configured to instruct the user equipment to switch from the first measurement mode to the second measurement mode in the case that the user equipment determines that the network configuration parameter changes with respect to a current network configuration parameter.

The network configuration parameter may include at least one of a neighboring cell list and a neighboring frequency point list. The network configuration parameters may be determined by the base station after the network configuration of the base station changes. The current network configuration parameters may be determined by the base station before the network configuration of the base station changes. That is, the current network configuration parameters may include parameters used by the user equipment in the first measurement mode.

In another embodiment, the configuration information may include preset time information, and the preset time information may include a preset time or a preset time period. The preset time may be the time when the user equipment starts the second measurement mode, that is, the time when the user equipment switches from the first measurement mode to the second measurement mode. The preset time may also be the time when the user equipment stops the second measurement mode, that is, the time when the user equipment switches from the second measurement mode to the first measurement mode. The preset time period may be configured to indicate a duration during which the user equipment maintains the first measurement mode, i.e., the duration the user equipment works in the first measurement mode after the user equipment switches form the second measurement mode to the first measurement mode. The preset time period may also be configured to indicate a duration during which the user equipment maintains the second measurement mode, i.e., the duration the user equipment works in the second measurement mode after the user equipment switches form the first measurement mode to the second measurement mode.

In another embodiment, the configuration information includes a first parameter corresponding to the first measurement mode and a second parameter corresponding to the second measurement mode, or the configuration information includes a second parameter corresponding to the second measurement mode.

The first parameter includes a first measurement parameter and/or a first offset, and the second parameter includes a second measurement parameter and/or a second offset. The first measurement parameter or the first offset is configured to indicate that the user equipment works in a first measurement mode. The second measurement parameter or the second offset is configured to indicate that the user equipment works in the second measurement mode.

It should be noted that, in the case that the user equipment works in the first measurement mode, if the configuration information received by the user equipment includes the first parameter corresponding to the first measurement mode and the second parameter corresponding to the second measurement mode, the user equipment can continue to work in the first measurement mode. If the configuration information received by the user equipment includes only the second parameter corresponding to the second measurement mode, that is, the first parameter corresponding to the first measurement mode is not included, the user equipment may switch from the first measurement mode to the second measurement mode.

In some embodiments of the present disclosure, the base station may send configuration information to the user equipment in the case that the network configuration of the base station changes. The network configuration of the base station includes a frequency point configuration and a cell configuration of the base station. The network configuration of the base station changes, refers to that, the frequency point configuration or cell configuration of the base station changes. The change of frequency point configuration or cell configuration of the base station may be due to the operator planning a new cell or deploying a new frequency point or replanning the frequency spectrum.

For example, the frequency point configuration of the base station may include a frequency point information list, and the frequency point information list of the base station may be as shown in Table 1, including a frequency point, an uplink channel frequency, and a downlink channel frequency.

TABLE 1

| frequency point | uplink channel frequency | downlink channel frequency |
|---|---|---|
| 1 | 890.2 | 935.2 |
| 2 | 890.4 | 935.4 |
| 3 | 890.6 | 935.6 |
| 4 | 8901 | 9351 |
| 5 | 891.2 | 931.2 |

It can be understood that if the operator plans a new cell or deploys a new frequency point or re-plans the frequency spectrum, the frequency point information list shown in Table 1 can be updated accordingly, that is, adding new frequency points, and the uplink channel frequency and the downlink channel frequency corresponding to the new frequency points.

302: sending, by the base station, a measurement configuration parameter to the user equipment, where the measurement configuration parameters are configured to indicate a second measurement trigger condition.

Exemplarily, the base station may determine the measurement configuration parameters according to parameters such as the distance between the base station and other base stations, the transmit power of the base station, and the transmit power of the user equipment stored by the base station. The user equipment may determine the second measurement trigger condition according to the measurement configuration parameter sent by the base station.

In some embodiments of the present disclosure, the base station may not send measurement configuration parameters. The user equipment may determine the second measurement trigger condition according to the network configuration parameter in the configuration information sent by the base station.

303: the user equipment switching from the first measurement mode to the second measurement mode according to the configuration information.

It should be noted that the user equipment receiving the configuration information is in an idle state or an inactive state.

The user equipment that is in an idle state or in an inactive state can receive system messages, broadcast messages, or RRC messages, so that it can receive configuration information sent by the base station. The user equipment may periodically measure the current cell, and may determine whether a neighboring cell of the user equipment meets the first measurement trigger condition or the second measurement trigger condition. If the user equipment determines that the neighboring cell of the user equipment meets the first measurement trigger condition or the second measurement trigger condition, it may trigger the user equipment to measure the neighboring cell. The neighboring cells include intra-frequency neighboring cells and inter-frequency neighboring cells.

In some embodiments of the present disclosure, in the case that the configuration information includes the first indication information, the user equipment may switch from the first measurement mode to the second measurement mode according to the first indication information.

For example, the bit value of the first indication information may be 1, which may instruct the user equipment to switch from the first measurement mode to the second measurement mode.

In another embodiment, in the case that the configuration information includes network configuration parameters, if the user equipment determines that the network configuration parameter changes with respect to the current network configuration parameter, it switches from the first measurement mode to the second measurement mode.

The network configuration parameter includes at least one of a neighboring cell list and a neighboring frequency point list. The current network configuration parameter is a parameter used by the user equipment in the first measurement mode, that is, a neighboring cell list or a neighboring frequency point list used by the user equipment in the first measurement mode. The current network configuration parameters may be sent to the user equipment before the base station determines that the network configuration of the base station has changed. The network configuration parameters included in the configuration information are parameters used by the user equipment in the second measurement mode, that is, a neighboring cell list or a neighboring frequency point list used by the user equipment in the second measurement mode. The network configuration parameters included in the configuration information may be sent by the base station to the user equipment after determining that the network configuration of the base station has changed.

In another embodiment, the configuration information may include preset time information, and the preset time information may include a preset time or a preset time period.

The preset time may be the time when the user equipment starts the second measurement mode, that is, the time when the user equipment switches from the first measurement mode to the second measurement mode. The preset time may also be the time when the user equipment stops the second measurement mode, that is, the time when the user equipment switches from the second measurement mode to the first measurement mode.

The preset time period may be configured to indicate a duration during which the user equipment maintains the first measurement mode. That is, the duration the user equipment works in the first measurement mode after the user equipment switches form the second measurement mode to the first measurement mode. The preset time period may be configured to indicate a duration during which the user equipment maintains the second measurement mode. That is, the duration the user equipment works in the second measurement mode after the user equipment switches form the first measurement mode to the second measurement mode.

In another embodiment, the configuration information includes a first parameter corresponding to the first measurement mode and a second parameter corresponding to the second measurement mode, or the configuration information includes a second parameter corresponding to the second measurement mode. The first parameter includes a first measurement parameter and/or a first offset, and the second parameter includes a second measurement parameter and/or a second offset. The first measurement parameter or the first offset is configured to indicate that the user equipment works in a first measurement mode. The second measurement parameter or the second offset is configured to indicate that the user equipment works in the second measurement mode.

When the user equipment switches from the first measurement mode to the second measurement mode, the user equipment needs to acquire a second measurement trigger condition. The second measurement trigger condition may be determined by the base station or the user equipment.

If the second measurement trigger condition may be determined by the base station, the user equipment may receive the measurement configuration parameter sent by the base station in step 302, and determine the second measurement trigger condition according to the measurement configuration parameter. The user equipment then reconfigures the first measurement trigger condition to the second measurement trigger condition.

304: sending, by the network equipment, a cell selection reselection parameter.

The cell selection reselection parameter includes a cell selection reselection parameter corresponding to the first measurement trigger condition and/or the cell selection reselection parameter corresponding to the second measurement trigger condition sent by the network equipment.

305: performing, by the user equipment, a cell selection or reselection according to the cell selection reselection parameter.

The user equipment may perform a cell selection or reselection according to the cell selection reselection parameter corresponding to the first measurement trigger condition, or the user equipment may perform a cell selection or reselection according to the cell selection reselection parameter corresponding to the second measurement trigger condition.

That is, in the case that the user equipment works in the first measurement mode, if the first measurement trigger condition is met, the user equipment may be triggered to measure the current cell and/or the neighboring cell, and then the cell selection or reselection may be performed according to the cell selection reselection parameters corresponding to the first measurement trigger condition. In the case that the user equipment works in the second measurement mode, if the second measurement trigger condition is met, the user equipment may be triggered to measure the current cell and/or the neighboring cell, and then the cell selection or reselection may be performed according to the cell selection reselection parameters corresponding to the second measurement trigger condition.

It can be understood that the cell selection or reselection includes the selection or reselection of intra-frequency cell and the selection or reselection of inter-frequency cell.

Compared with the related art, when the network deployment or planning changes, if the user equipment still adopts the first measurement mode, the user equipment will still camp on the current cell because the measurement trigger conditions of the first measurement mode are stricter. Only when the quality of the current cell is further deteriorated, the measurement of neighboring cells or neighboring frequency points may be triggered, which is not conducive to the full use of network resources. According to the embodiment of the present disclosure, when the network deployment or planning changes, for example, the operator plans a new cell or deploys a new frequency point or re-plans the frequency spectrum, the user equipment may receive the configuration information sent by the network equipment, and switch from the first measurement mode to the second measurement mode according to the configuration information. Therefore, the user equipment may adopt the second measurement mode. Since the second measurement mode is easier to trigger the measurement than the first measurement mode, the user equipment can trigger the measurements of neighboring cells or neighboring frequency points, and can reselect, based on the measurement results, the cell which is newly planned by operator, thereby realizing an offload, so as to make full use of network resources.

Figure 4:
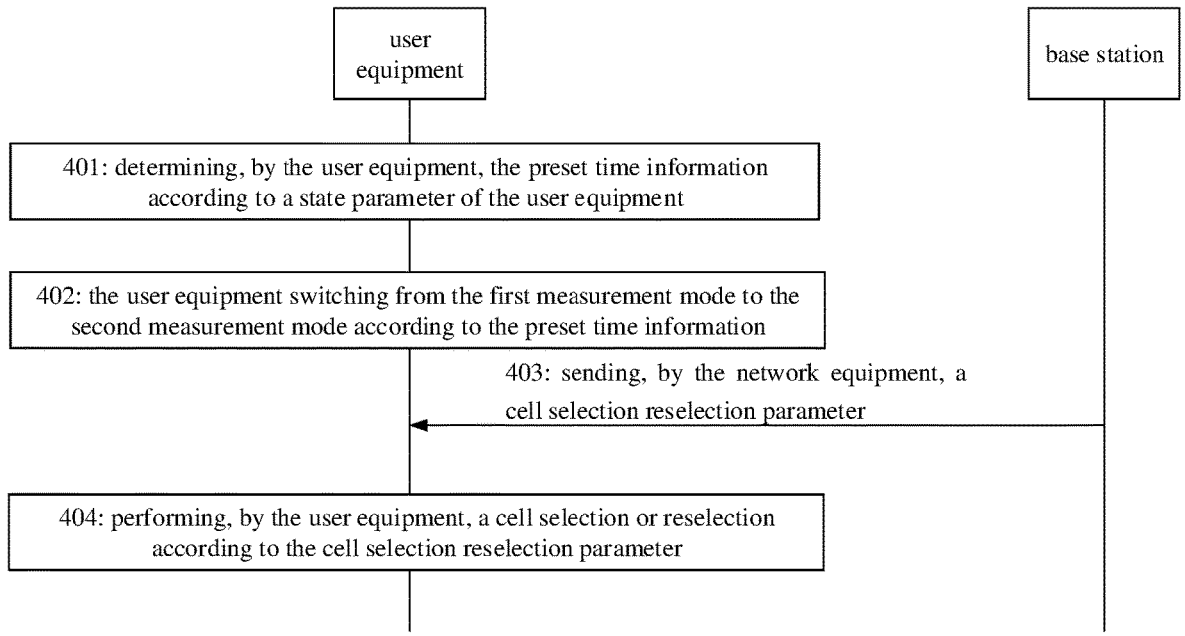
FIG. 4 is a schematic view of a signal interaction of a switching measurement mode in an embodiment of the present disclosure.

A method of switching a measurement mode is provided in the embodiment of the present disclosure, where the network equipment is a base station for example. As shown in FIG. 4, the method includes:

401: determining, by the user equipment, the preset time information according to a state parameter of the user equipment.

The state parameter of the user equipment includes at least one of: a type of the user equipment, whether the user equipment is movable, a maximum moving speed of the user equipment, a current moving state of the user equipment, a current service state of the user equipment, a state of a network where the user equipment is currently located, and a state of a channel where the user equipment is currently located.

The preset time information may include a preset time or a preset time period. The preset time may be the time when the user equipment starts the second measurement mode, that is, the time when the user equipment switches from the first measurement mode to the second measurement mode. The preset time may also be the time when the user equipment stops the second measurement mode, that is, the time when the user equipment switches from the second measurement mode to the first measurement mode. The preset time period may be configured to indicate a duration during which the user equipment maintains the first measurement mode, so as to the enable the user equipment to switch form the first measurement mode to the second measurement mode after the preset duration. The preset time period may also be configured to indicate a duration during which the user equipment maintains the second measurement mode, i.e., the duration the user equipment works in the second measurement mode after the user equipment switches form the first measurement mode to the second measurement mode.

For a description of the first measurement mode and the second measurement mode, reference may be made to step 301.

402: the user equipment switching from the first measurement mode to the second measurement mode according to the preset time information.

In the case that the preset time information includes a preset time and the preset time is a time to start the second measurement mode, the user equipment starts the second measurement mode at the preset time. That is, the user equipment can switch from the first measurement mode to the second measurement mode at the preset time.

In the case that the preset time information includes a preset time and the preset time is a time to stop the second measurement mode, the user equipment stops the second measurement mode at the preset time. That is, the user equipment can switch from the second measurement mode to the first measurement mode at the preset time.

In the case that the preset time information includes a preset time period, and the preset time period is a duration of the second measurement mode, the user equipment maintains the second measurement mode during the preset time period. That is, the user equipment may switch from the first measurement mode to the second measurement mode at the beginning of the preset time period, and may maintain the second measurement mode during the preset time period.

In the case that the preset time information includes a preset time period, and the preset time period is a duration of the first measurement mode, the user equipment maintains the first measurement mode in the preset time period. Therefore, the user equipment may switch from the first measurement mode to the second measurement mode at the end of the preset time period.

403: sending, by the network equipment, a cell selection reselection parameter.

The cell selection reselection parameter includes a cell selection reselection parameter corresponding to the first measurement trigger condition and/or a cell selection reselection parameter corresponding to the second measurement trigger condition and sent by the network equipment.

404: performing, by the user equipment, a cell selection or reselection according to the cell selection reselection parameter.

The user equipment may perform a cell selection or reselection according to the cell selection reselection parameter corresponding to the first measurement trigger condition, or the user equipment may perform a cell selection or reselection according to the cell selection reselection parameter corresponding to the second measurement trigger condition.

The specific process may refer to step 304.

Therefore, the user equipment may switch from the first measurement mode to the second measurement mode according to the preset time information. In this way, in the case that the network deployment or planning changes, for example, the operator plans a new cell or deploys a new frequency point or re-plans the frequency spectrum, the user equipment may adopt the second measurement mode. Due to the lower measurement threshold of the second measurement mode, the user equipment may trigger the measurement of neighboring cells or neighboring frequency points, and may reselect, according to the measurement results, to the cell newly planned by the operator, thereby making full use of network resources and realizing an offload. If the user equipment still uses the first measurement mode in the case that the network deployment or planning changes, the user equipment will still camp on the cell because the measurement threshold of the first measurement mode is high. Only when the quality of the current cell is further deteriorated, the measurement of neighboring cells or neighboring frequency points may be triggered, which is not conducive to the full use of network resources.

The above mainly introduces the solution provided by the embodiment of the present disclosure from the perspective of network equipment and user equipment. It can be understood that, in order to implement the above functions, the network equipment and the user equipment include a hardware structure and/or a software module corresponding to each function. Those skilled in the art should easily realize that the present disclosure can be implemented in hardware or a combination of hardware and computer software in combination with the algorithm steps described in the embodiments disclosed herein. Whether a certain function is performed by hardware or computer software-driven hardware depends on the specific application and design constraints of the technical solution. A person skilled in the art can use different methods to implement the described functions for each specific application, but such implementation should not be considered to be beyond the scope of the present disclosure.

In the embodiment of the present disclosure, the functional modules may be divided into network equipment and user equipment according to the foregoing method examples. For example, each functional module may be divided corresponding to each function, or two or more functions may be integrated into one processing module. The above integrated modules can be implemented in the form of hardware or software functional modules. It should be noted that the division of the modules in the embodiment of the present disclosure is schematic, and is only a logical function division. In actual implementation, there may be another division manner.

Figure 5:
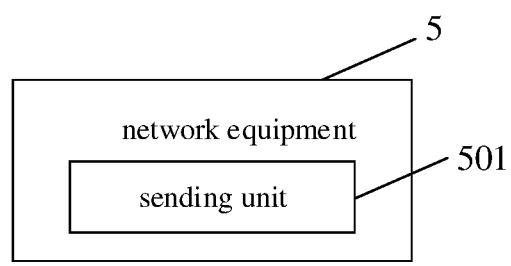
FIG. 5 is a schematic view of a network equipment in an embodiment of the present disclosure.

In a case where each functional module is divided corresponding to each function, FIG. 5 shows a possible structural diagram of the network equipment 5 involved in the foregoing embodiment. The network equipment includes a sending unit 501. In the embodiment of the present disclosure, the sending unit 501 may be configured to send configuration information to the user equipment, so that the user equipment switches from the first measurement mode to the second measurement mode according to the configuration information. In the method embodiments shown in FIG. 3 and FIG. 4, the sending unit 501 is configured to support a network equipment to perform processes 301 and 304 in FIG. 3 and process 403 in FIG. 4. Wherein, all relevant content of each step involved in the above method embodiment can be referred to the functional description of the corresponding functional module, which will not be repeated here.

Figure 6:
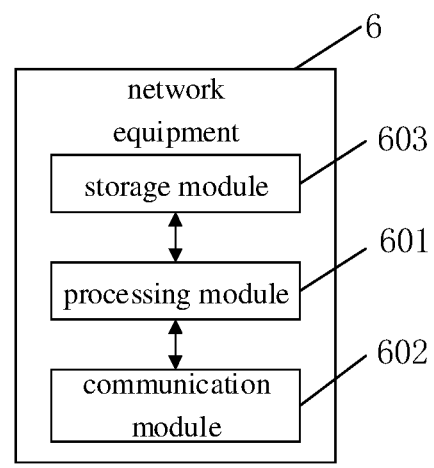
FIG. 6 is a schematic view of a network equipment in an embodiment of the present disclosure.

In the case of using an integrated unit, FIG. 6 shows a possible structure diagram of a network equipment involved in the foregoing embodiment. In the present disclosure, the network equipment may include a processing module 601, a communication module 602, and a storage module 603. Among them, the processing module 601 is configured to control various hardware devices and application software of the network equipment; the communication module 602 is configured to receive instructions sent by other devices using communication methods such as Wireless Fidelity (WiFi), and can also The data of the network equipment is sent to other devices; the storage module 603 is configured to execute the storage of the software program of the network equipment, the storage of the data, and the running of the software. The processing module 601 may be a processor or a controller. For example, the processing module 601 may be a central processing unit (CPU), a general-purpose processor, a digital signal processor (DSP), and an application-specific integrated circuit. Circuit (ASIC), Field Programmable Gate Array (FPGA), or other programmable logic devices, transistor logic devices, hardware components, or any combination thereof. It may implement or execute various exemplary logical blocks, modules, and circuits described in connection with the present disclosure. A processor may also be a combination that implements computing functions, such as a combination of one or more microprocessors, a combination of a DSP and a microprocessor, and so on. The communication module 602 may be a transceiver, a transceiver circuit, or a communication interface. The storage module 603 may be a memory.

In the embodiment of the present disclosure, the processing module 601 may be configured to determine configuration information.

The communication module 602 may be configured to send configuration information to the user equipment, so that the user equipment may switch from the first measurement mode to the second measurement mode according to the configuration information.

The storage module 603 may be configured to store a configuration message in the embodiment of the present disclosure.

Figure 7:
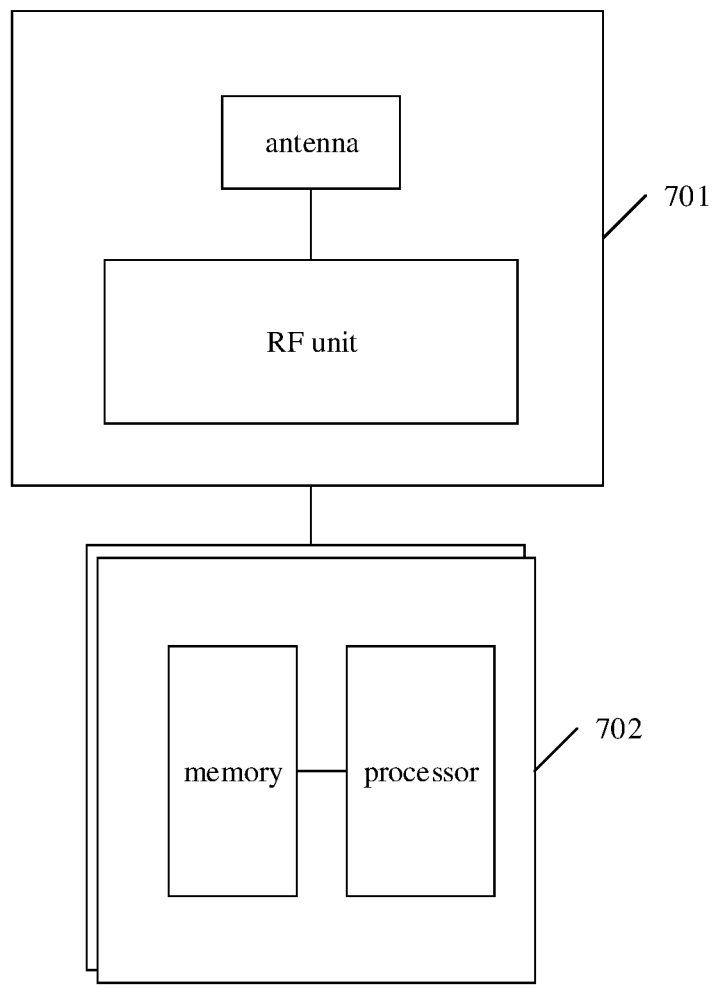
FIG. 7 is a schematic view of a network equipment in an embodiment of the present disclosure.

A network equipment is further provided in the embodiment of the present disclosure, such as a base station. FIG. 7 shows a simplified structure of a base station. The base station includes a part 701 and a part 702. Part 701 is mainly used for transmitting and receiving radio frequency signals and switching radio frequency signals to baseband signals. Part 702 is mainly used for baseband processing and controlling base stations. The part 701 may be generally called a transceiver unit, a transceiver, a transceiver circuit, or a transceiver. The part 702 is usually the control center of the base station, which can usually be called a processing unit, which is configured to control the base station to perform the steps performed on the base station (that is, the serving base station) in FIG. 7 described above. For details, please refer to the description of the relevant part above.

The transceiver unit of the Part 701 can also be called a transceiver or a transceiver, which includes an antenna and a radio frequency unit. The radio frequency unit is mainly used for radio frequency processing. Optionally, the device configured to implement the receiving function in part 701 can be regarded as a receiving unit, and the device configured to implement the transmitting function can be regarded as a transmitting unit, that is, the part 701 includes a receiving unit and a transmitting unit. The receiving unit may also be called a receiver, a receiver, or a receiving circuit, and the sending unit may be called a transmitter, a transmitter, or a transmitting circuit.

The part 702 may include one or more single boards, and each single board may include one or more processors and one or more memories. The processors are configured to read and execute programs in the memory to implement baseband processing functions and control the base station. If there are multiple boards, the boards can be interconnected to increase processing capacity. As an optional implementation manner, multiple single boards may share one or more processors, or multiple single boards may share one or more memories, or multiple single boards may share one or more processes at the same time. The memory and the processor may be integrated together, or may be independently set. In some embodiments, the part 701 and the part 702 may be integrated together or may be separately provided. In addition, all functions in part 702 can be integrated into one chip, and part of the functions can also be integrated into one chip, and other functions can be integrated into one or more chips, which is not limited in the present disclosure.

Figure 8:
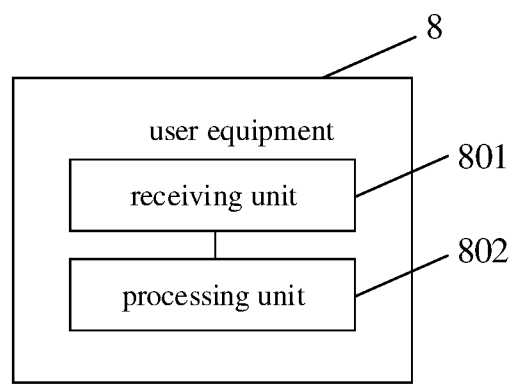
FIG. 8 is a schematic view of a user equipment in an embodiment of the present disclosure.

In a case where each functional module is divided according to each function, FIG. 8 shows a possible structural diagram of the user equipment 8 involved in the foregoing embodiment. The user equipment includes a receiving unit 801 and a processing unit 802. In the embodiment of the present disclosure, the receiving unit 801 may be configured to receive configuration information sent by a network equipment. The processing unit 802 may be configured to convert from the first measurement mode to the second measurement mode according to the preset time information. In the method embodiments shown in FIG. 3 and FIG. 4, the receiving unit 801 is configured to support a user equipment to perform the processes 301, 302, and 304 in FIG. 3 or the process 403 in FIG. 4. The processing unit 802 is configured to support the user equipment to perform processes 303 and 305 in FIG. 3 or processes 401, 402, and 404 in FIG. 4. Wherein, all relevant content of each step involved in the above method embodiment can be referred to the functional description of the corresponding functional module, which will not be repeated here.

Figure 9:
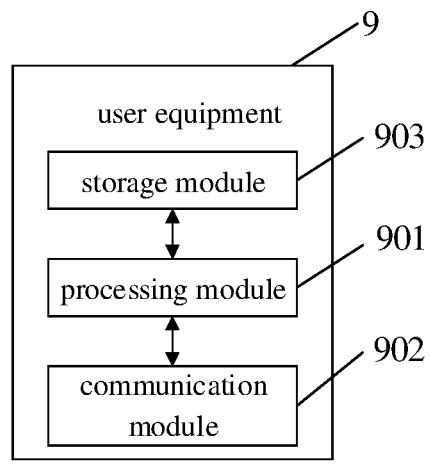
FIG. 9 is a schematic view of a user equipment in an embodiment of the present disclosure.

In the case of using an integrated unit, FIG. 9 shows a possible structural diagram of a user equipment involved in the foregoing embodiment. In the present disclosure, the user equipment may include a processing module 901, a communication module 902, and a storage module 903. Among them, the processing module 901 is configured to control various hardware devices and application software of the user equipment; the communication module 902 is configured to receive instructions sent by other devices using communication methods such as WiFi, and can also send data of the user device to other devices The storage module 903 is configured to execute storage of a software program of the user equipment, storage of data, and execution of software. The processing module 901 may be a processor or a controller. For example, the processing module 901 may be a CPU, a general-purpose processor, a DSP, an ASIC, an FPGA, or other programmable logic devices, transistor logic devices, hardware components, or any combination thereof. It may implement or execute various exemplary logical blocks, modules, and circuits described in connection with the present disclosure. A processor may also be a combination that implements computing functions, such as a combination of one or more microprocessors, a combination of a DSP and a microprocessor, and so on. The communication module 902 may be a transceiver, a transceiver circuit, or a communication interface. The storage module 903 may be a memory.

In the embodiment of the present disclosure, the processing module 901 may be configured to perform the switching from the first measurement mode to the second measurement mode according to the preset time information.

The communication module 902 may be configured to receive configuration information sent by a network equipment.

The storage module 903 may be configured to store configuration information in the embodiment of the present disclosure.

Figure 10:
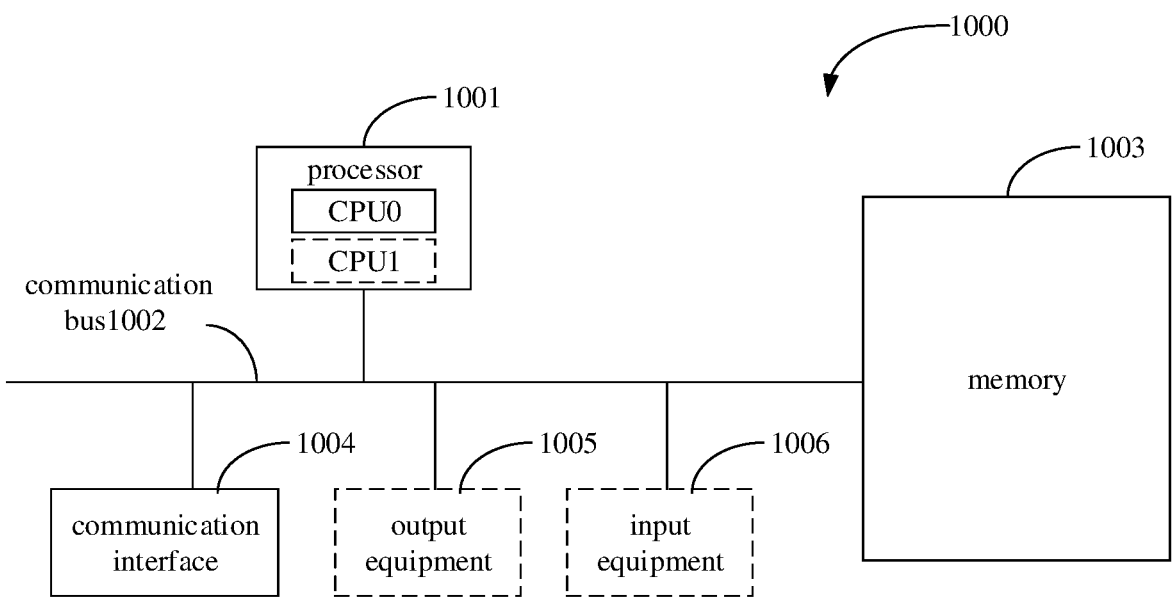
FIG. 10 is a schematic view of a user equipment in an embodiment of the present disclosure.

When the processing module 901 is a processor, the communication module 902 is a communication interface, and the storage module 903 is a memory, the user equipment may be implemented by the computer device (or system) in FIG. 10.

FIG. 10 is a schematic view of a computer device in an embodiment of the present disclosure. The computer device 1000 includes at least one processor 1001, a communication bus 1002, a memory 1003, and at least one communication interface 1004.

The processor 1001 may be a general-purpose central processing unit (CPU), a microprocessor, an application-specific integrated circuit (ASIC), or one or more integrated circuits for the execution of the program of the solution of the present disclosure.

The communication bus 1002 may include a path for transmitting information between the aforementioned components.

The communication interface 1004 uses any device such as a transceiver to communicate with other devices or communication networks, such as Ethernet, radio access network (RAN), wireless local area networks (WLAN), and the like.

The memory 1003 may be a read-only memory (ROM) or other type of static storage device that can store static information and instructions, a random access memory (RAM), or other type that can store information and instructions The dynamic storage device can also be electrically erasable programmable read-only memory (EEPROM), compact disc read-only memory (CD-ROM) or other optical disk storage, optical disk storage (Including compact discs, laser discs, optical discs, digital versatile discs, Blu-ray discs, etc.), disk storage media or other magnetic storage devices, or can be configured to carry or store desired program code in the form of instructions or data structures and can be stored by a computer Any other media, but not limited to this. The memory may exist independently and be connected to the processor through a bus. The memory can also be integrated with the processor.

The memory 1003 is configured to store application program code for executing the solution of the present disclosure, and the processor 1001 controls execution of the application program code. The processor 1001 is configured to execute application program code stored in the memory 1003, so as to implement functions in the method of the present patent.

In a specific implementation, as an embodiment, the processor 1001 may include one or more CPUs, such as CPU0 and CPU1 in FIG. 10.

In a specific implementation, as an embodiment, the computer device 1000 may include a processor 1001. Each of the processors may be a single-core (single-CPU) processor or a multi-core (multi-CPU) processor. A processor herein may refer to one or more devices, circuits, and/or processing cores for processing data (such as computer program instructions).

In a specific implementation, as an embodiment, the computer device 1000 may further include an output device 1005 and an input device 1006. The output device 1005 communicates with the processor 1001 and can display information in a variety of ways. For example, the output device 1005 may be a liquid crystal display (LCD), a light emitting diode (LED) display device, a cathode ray tube (CRT) display device, or a projector. The input device 1006 communicates with the processor 1001 and can accept user input in a variety of ways. For example, the input device 1006 may be a mouse, a keyboard, a touch screen device, a sensing device, or the like.

The computer device 1000 described above may be a general-purpose computer device or a special-purpose computer device. In a specific implementation, the computer device 1000 may be a desktop computer, a portable computer, a network server, a personal digital assistant (PDA), a mobile phone, a tablet computer, a wireless terminal device, a communication device, an embedded device, or the device shown in FIG. 10. Similar structure of equipment. The embodiment of the present disclosure does not limit the type of the computer device 1000.

The steps of the method or algorithm described in combination with the disclosure of the present disclosure may be implemented in a hardware manner, or may be implemented in a manner that a processor executes software instructions. Software instructions may be composed of corresponding software modules, and the software modules may be stored in RAM, flash memory, ROM, EPROM, EEPROM, registers, hard disk, mobile hard disk, read-only optical disk, or any other form of storage medium known in the art. An exemplary storage medium is coupled to the processor such that the processor can read information from, and write information to, the storage medium. Of course, the storage medium may also be an integral part of the processor. The processor and the storage medium may camp on an ASIC. In addition, the ASIC can be located in a core network interface device. Of course, the processor and the storage medium can also exist as discrete components in the core network interface device.

Those skilled in the art should appreciate that, in one or more of the above examples, the functions described in the present disclosure may be implemented by hardware, software, firmware, or any combination thereof. When implemented in software, these functions may be stored in or transmitted over as one or more instructions or code on a computer-readable medium. Computer-readable media includes computer storage media and communication media including any medium that facilitates transfer of a computer program from one place to another. A storage media may be any available media that can be accessed by a general purpose or special purpose computer.

The specific embodiments described above further describe the objectives, technical solutions, and beneficial effects of the present disclosure in detail. It should be understood that the above are only specific embodiments of the present disclosure and are not intended to limit the present disclosure. The scope of protection, any modification, equivalent replacement, and improvement made on the basis of the technical solution of the present disclosure shall be included in the scope of the present disclosure.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program code.

Embodiments of the present disclosure are described with reference to flowcharts and/or block diagrams of methods, devices (systems), and computer program products according to embodiments of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, special-purpose computer, embedded processor, or other programmable data processing device to produce a machine, so that the instructions generated by the processor of the computer or other programmable data processing device are configured to generate instructions Means for implementing the functions specified in one or more flowcharts and/or one or more blocks of the block diagrams.

These computer program instructions may also be stored in a computer-readable memory capable of instructing a computer or other programmable data processing device to work in a specific manner such that the instructions stored in the computer-readable memory produce a manufactured article including an instruction device, the instructions The device implements the functions specified in one or more flowcharts and/or one or more blocks of the block diagram.

These computer program instructions can also be loaded onto a computer or other programmable data processing device, so that a series of steps can be performed on the computer or other programmable device to produce a computer-implemented process, which can be executed on the computer or other programmable device. The instructions provide steps for implementing the functions specified in one or more flowcharts and/or one or more blocks of the block diagrams.

Obviously, those skilled in the art can make various modifications and variations to the embodiments of the present disclosure without departing from the principle of the present disclosure. In this way, if these modifications and variations of the embodiments of the present disclosure fall within the scope of the claims of the present disclosure and their equivalent technologies, the present disclosure also intends to include these changes and modifications.

What is claimed is:

1. A method of switching a measurement mode, comprising:
    sending, by a network equipment, configuration information to a user equipment, to enable the user equipment to switch from a first measurement mode to a second measurement mode according to the configuration information;
    wherein the first measurement mode is a mode of triggering the user equipment to measure a current cell and/or a neighboring cell in the case that a first measurement trigger condition is met; and
    the second measurement mode is a mode of triggering the user equipment to measure a current cell and/or a neighboring cell in the case that a second measurement trigger condition is met,
    wherein the sending, by the network equipment, configuration information to the user equipment, to enable the user equipment to switch from the first measurement mode to the second measurement mode according to the configuration information comprises:
    sending, by the network equipment, the configuration information to the user equipment, to enable the user equipment to acquire the second measurement trigger condition and reconfigure the first measurement trigger condition to the second measurement trigger condition;
    wherein the first measurement trigger condition comprises one of: a receiving performance of the current cell is less than a first threshold, the receiving performance of the current cell and a first compensation value are less than the first threshold, or a first state parameter changes;
    the second measurement trigger condition comprises one of: the receiving performance of the current cell is less than a second threshold, the receiving performance of the current cell and a second compensation value are less than the second threshold, a second state parameter changes.

2. The method according to claim 1, wherein the configuration information comprises first indication information configured to instruct switching from the first measurement mode to the second measurement mode.

3. The method according to claim 1, wherein the configuration information comprises second indication information configured to indicate whether to allow the first measurement mode or the second measurement mode to be enabled.

4. The method according to claim 1, wherein the configuration information comprises a network configuration parameter configured to instruct the user equipment to switch from the first measurement mode to the second measurement mode in the case that the user equipment determines that the network configuration parameter changes with respect to a current network configuration parameter;
    wherein the network configuration parameter comprises at least one of a neighboring cell list and a neighboring frequency point list.

5. The method according to claim 1, wherein the configuration information comprises preset time information, the preset time information comprises a preset time point or a preset time period, and the preset time point is configured to indicate a time point of starting or stopping the second measurement mode, the preset time period is configured to indicate a duration of the first measurement mode or the second measurement mode.

6. The method according to claim 1, wherein the configuration information comprises a first parameter corresponding to the first measurement mode and a second parameter corresponding to the second measurement mode, or the configuration information comprises a second parameter corresponding to the second measurement mode, wherein the first parameter comprises a first measurement parameter and/or a first offset, and the second parameter comprises a second measurement parameter and/or a second offset;
    wherein the network equipment sends a cell selection reselection parameter corresponding to the first measurement trigger condition, and/or the network equipment sends a cell selection reselection parameter corresponding to the second measurement trigger condition.

7. A network equipment, comprising a memory, a processor and a computer program stored in the memory and executable on the processor, wherein the computer program is executed by the processor to perform the method of switching a measurement mode according to claim 1.

8. A method of switching a measurement mode, applied to user equipment, wherein the user equipment is in a first measurement mode, and the method comprises:
    receiving, by the user equipment, configuration information sent by a network equipment; and
    the user equipment switching from the first measurement mode to a second measurement mode according to the configuration information;

wherein the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met, wherein the switching from the first measurement mode to the second measurement mode comprises:

acquiring, by the user equipment, the second measurement trigger condition;

reconfiguring, by the user equipment, the first measurement trigger condition to the second measurement trigger condition;

wherein the first measurement trigger condition comprises one of: a receiving performance of the current cell is less than a first threshold, the receiving performance of the current cell and a first compensation value are less than the first threshold, or a first state parameter changes;

the second measurement trigger condition comprises one of: the receiving performance of the current cell is less than a second threshold, the receiving performance of the current cell and a second compensation value are less than the second threshold, a second state parameter changes.

9. The method according to claim 8, wherein the configuration information comprises first indication information configured to instruct switching from the first measurement mode to the second measurement mode.

10. The method according to claim 8, wherein the configuration information comprises second indication information configured to indicate whether to allow the first measurement mode or the second measurement mode to be enabled.

11. The method according to claim 8, wherein the configuration information comprises a network configuration parameter, and the user equipment switching from a first measurement mode to a second measurement mode according to the configuration information comprises:

the user equipment switching from the first measurement mode to the second measurement mode in the case that the user equipment determines that the network configuration parameter changes with respect to a current network configuration parameter, wherein the current network configuration parameter is a parameter used by the user equipment in the first measurement mode.

12. The method according to claim 11, wherein the network configuration parameter comprises at least one of a neighboring cell list and a neighboring frequency point list.

13. The method according to claim 8, wherein the configuration information comprises preset time information, the preset time information comprises a preset time point or a preset time period, and the preset time point is configured to indicate a time point of starting or stopping the second measurement mode, the preset time period is configured to indicate a duration of the first measurement mode or the second measurement mode.

14. The method according to claim 8, wherein the configuration information comprises a first parameter corresponding to the first measurement mode and a second parameter corresponding to the second measurement mode, or the configuration information comprises a second parameter corresponding to the second measurement mode, wherein the first parameter comprises a first measurement parameter and/or a first offset, and the second parameter comprises a second measurement parameter and/or a second offset.

15. The method according to claim 8, wherein the acquiring, by the user equipment, the second measurement trigger condition comprises:

receiving, by the user equipment, a measurement configuration parameter sent by the network equipment, wherein the measurement configuration parameter is configured to indicate the second measurement trigger condition;

or, determining, by the user equipment, the second measurement trigger condition according to the network configuration parameter.

16. The method according to claim 8, wherein the user equipment performs a cell selection or reselection according to a cell selection reselection parameter corresponding to the first measurement trigger condition, or the user equipment performs a cell selection or reselection according to a cell selection reselection parameter corresponding to the second measurement trigger condition.

17. A user equipment, comprising a memory, a processor and a computer program stored in the memory and executable on the processor, wherein the computer program is executed by the processor to perform the method of switching a measurement mode according to claim 8.

18. A method of switching a measurement mode, applied to user equipment, wherein the user equipment is in a first measurement mode, and the method comprises:

the user equipment switching from a first measurement mode to a second measurement mode according to a preset time information;

wherein the first measurement mode is a mode of triggering the user equipment to measure a current cell and/or a neighboring cell in the case that a first measurement trigger condition is met; and the second measurement mode is a mode of triggering the user equipment to measure a current cell and/or a neighboring cell in the case that a second measurement trigger condition is met, wherein the preset time information comprises a preset time point or a preset time period, and the preset time point is configured to indicate a time point of starting or stopping the second measurement mode, the preset time period is configured to indicate a duration of the first measurement mode or the second measurement mode;

wherein prior to the user equipment switching from a first measurement mode to a second measurement mode according to a preset time information, the method further comprises:

determining, by the user equipment, the preset time information according to a state parameter of the user equipment, wherein the state parameter of the user equipment comprises at least one of: a type of the user equipment, whether the user equipment is movable, a maximum moving speed of the user equipment, a current moving state of the user equipment, a current service state of the user equipment, a state of a network where the user equipment is currently located, and a state of a channel where the user equipment is currently located; or, wherein prior to the user equipment switching from a first measurement mode to the second measurement mode according to a preset time information, the method further comprises:

receiving, by the user equipment, configuration information sent by a network equipment, wherein the configuration information comprises the preset time information;

or, wherein the user equipment performs a cell selection or reselection according to a cell selection reselection parameter corresponding to the first measurement trigger condition, or the user equipment performs a cell selection or reselection according to a cell selection reselection parameter corresponding to the second measurement trigger condition.

19. A user equipment, comprising a memory, a processor and a computer program stored in the memory and executable on the processor, wherein the computer program is executed by the processor to perform the method of switching a measurement mode according to claim 18.

* * * * *